(12) United States Patent
Nakagawa

(10) Patent No.: US 12,172,587 B2
(45) Date of Patent: Dec. 24, 2024

(54) HEAT SHIELD SHEET AND VEHICLE WITH HEAT SHIELD SHEET

(71) Applicant: DENSO CORPORATION, Kariya (JP)

(72) Inventor: Mitsuru Nakagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 431 days.

(21) Appl. No.: 17/728,164

(22) Filed: Apr. 25, 2022

(65) Prior Publication Data

US 2022/0242335 A1 Aug. 4, 2022

Related U.S. Application Data

(63) Continuation of application No. PCT/JP2020/035073, filed on Sep. 16, 2020.

(30) Foreign Application Priority Data

Nov. 13, 2019 (JP) .................. 2019-205752

(51) Int. Cl.
*B60R 13/08* (2006.01)
*B62D 29/04* (2006.01)
*H01Q 1/00* (2006.01)
*H01Q 1/32* (2006.01)
*H01Q 1/42* (2006.01)

(52) U.S. Cl.
CPC .......... *B60R 13/0869* (2013.01); *B62D 29/04* (2013.01); *H01Q 1/002* (2013.01); *H01Q 1/3275* (2013.01); *H01Q 1/42* (2013.01)

(58) Field of Classification Search
CPC .... B60R 13/0869; B62D 29/04; H01Q 1/002; H01Q 1/3275; H01Q 1/42; H01Q 1/1221; H01Q 1/02; B32B 7/023
See application file for complete search history.

(56) References Cited

U.S. PATENT DOCUMENTS

| 10,476,144 B2 * | 11/2019 | Mizutani | H01Q 1/32 |
| 2014/0062808 A1 * | 3/2014 | Kataoka | H01Q 1/40 |
| | | | 343/713 |
| 2015/0229020 A1 * | 8/2015 | Sugimoto | H05K 1/028 |
| | | | 343/702 |

FOREIGN PATENT DOCUMENTS

JP 2014050031 A 3/2014

* cited by examiner

*Primary Examiner* — Minh D A
(74) *Attorney, Agent, or Firm* — Harness, Dickey & Pierce, P.L.C.

(57) ABSTRACT

A heat shield sheet stacked at an upper surface of an upper plate of a vehicle includes a low emissivity coating layer having a white color, a base sheet on which the low emissivity coating layer is stacked, and a colored infrared transparent layer that is stacked on a solar radiation side of the low emissivity coating layer and transmits infrared rays. Since the low emissivity coating layer is a white color, the reflectance of sunlight is high. Therefore, the solar heat can be reflected efficiently by the low emissivity coating layer.

12 Claims, 4 Drawing Sheets

HEAT SHIELD SHEET AND VEHICLE WITH HEAT SHIELD SHEET

CROSS REFERENCE TO RELATED APPLICATION

The present application is a continuation application of International Patent Application No. PCT/JP2020/035073 filed on Sep. 16, 2020, which designated the U.S. and claims the benefit of priority from Japanese Patent Application No. 2019-205752 filed on Nov. 13, 2019. The entire disclosures of all of the above applications are incorporated herein by reference.

TECHNICAL FIELD

The present disclosure relates to a heat shield sheet and a vehicle provided with a heat shield sheet.

BACKGROUND

Electronic devices may be installed on the top of a vehicle, such as the roof of a vehicle. For example, an antenna device, which is an electronic device, is provided on the top of a vehicle. The top of the vehicle can become hot due to solar heat. When the electronic device is provided on the top of the vehicle, it is preferable that the electronic device is provided with a structure that makes it difficult for the temperature of the electronic device to rise, in order to maintain the performance.

SUMMARY

A heat shield sheet for a vehicle of the present disclosure may be stacked on an upper surface of an upper plate of the vehicle. The heat shield sheet includes a low emissivity coating layer having a white color, a base sheet on which the low emissivity coating layer is stacked, and a colored infrared transparent layer stacked on a solar radiation side of the low emissivity coating layer and configured to transmit infrared rays.

A vehicle of the present disclosure may include the heat shield sheet installed on the upper surface of the upper plate of the vehicle, and an electronic device installed at a position opposite to the heat shield sheet with respect to the upper plate.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
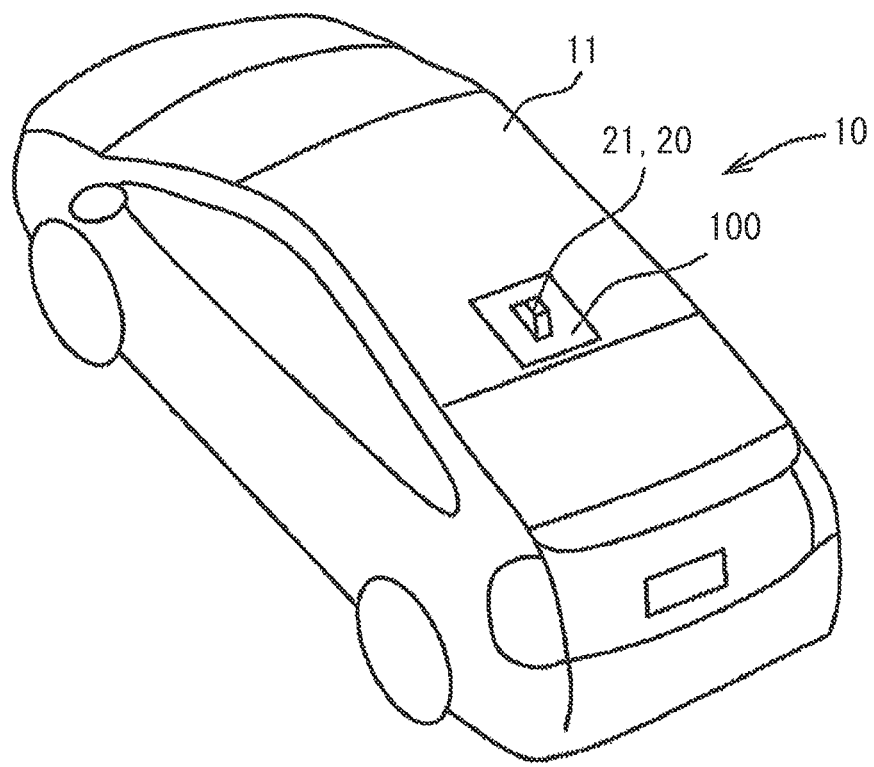
FIG. 1 is a view of a vehicle when being viewed from above of the vehicle.

A circuit portion may be provided in a housing protruding from the roof of a vehicle. This circuit portion may be provided at a position separated from the roof surface of the vehicle. Further, a heat transfer path may be provided between the circuit portion and the housing. In this case, the heat of the circuit portion can be released to the outside of the housing, and a temperature rise in the circuit portion can be suppressed.

However, it may be necessary to arrange an electronic device at a lower side of an upper plate of the vehicle such as the roof of the vehicle. The upper plate of the vehicle is a plate that can be seen when the vehicle is viewed from above. For example, the roof, trunk plate or bonnet of the vehicle respectively corresponds to the upper plate of the vehicle.

When the electronic device is arranged under the upper plate of the vehicle, a heat shield sheet for a vehicle that is stacked on the upper surface of the upper plate of the vehicle is required so as to efficiently shield the solar heat.

In view of the above-mentioned matters, it is an object of the present disclosure to provide a heat shield sheet for a vehicle, which efficiently shields solar heat, and a vehicle equipped with the heat shield sheet and an electronic device.

In order to achieve the above object of the present disclosure, the following technical configuration or the like will be adopted, for example.

A heat shield sheet for a vehicle of the present disclosure can be stacked on an upper surface of an upper plate of the vehicle. The heat shield sheet includes a low emissivity coating layer having a white color, a base sheet on which the low emissivity coating layer is stacked, and a colored infrared transparent layer stacked on a solar radiation side of the low emissivity coating layer and configured to transmit infrared rays.

The heat shield sheet includes the low emissivity coating layer. Since the low emissivity coating layer is the white color, the reflectance of sunlight is higher than that when the low emissivity coating layer is a color other than the white color. Therefore, the solar heat can be reflected efficiently by the low emissivity coating layer.

In addition, the heat shield sheet for a vehicle includes the colored infrared transparent layer that is stacked on the solar radiation side of the low emissivity coating layer and transmits infrared rays. By making the color of the colored infrared transparent layer to be the body color of the vehicle or a color similar to the body color, the heat shield sheet can be made inconspicuous even when the heat shield sheet is arranged on the vehicle.

Further, the low emissivity coating layer does not need to be changed in accordance with the body color. Therefore, the versatility of the low emissivity coating layer is improved. Further, since the colored infrared transparent layer transmits infrared rays, it is possible to prevent this layer from absorbing solar heat and from reducing the infrared reflection effect of the low emissivity coating layer positioned under the colored infrared transparent layer.

The low emissivity coating layer may be made of an infrared transmissive base material, and a high reflectance powder having an infrared reflectance, which is dispersed in the infrared transmissive base material. Furthermore, a colorless and infrared transparent top coat layer may be stacked on the colored infrared transparent layer.

For example, the colored infrared transparent layer may be a top layer and may be configured to have an ultraviolet-transmission suppressing function. The colored infrared transparent layer may be a single layer or may be configured by plural layers.

When the colored infrared transparent layer is made of plural layers, the colored infrared transparent layer may include a black paint layer which transmits infrared ray and stacked at the upper side of the base material sheet, and a decorative paint layer that is stacked on the black paint layer, is colored to be different from black and transmits infrared rays. The decorative paint layer may be made of a layer in which mica is dispersed in an infrared transparent paint.

A vehicle of the present disclosure may include the heat shield sheet for a vehicle installed on the upper surface of the upper plate of the vehicle, and an electronic device installed at a position opposite to the heat shield sheet with respect to the upper plate.

Hereinafter, multiple embodiments for implementing the present disclosure will be described with reference to the drawings. In each embodiment, a part corresponding to the part described in the preceding embodiment may be denoted by the same reference symbol or a reference symbol with one character added to the preceding reference symbol; thereby, redundant explanation may be omitted. In each embodiment, when only part of the configuration is described, the other part of the configuration can be the same as that in the preceding embodiment described above. The present disclosure is not limited to combinations of embodiments which combine parts that are explicitly described as being combinable. As long as no problems are present, the various embodiments may be partially combined with each other even if not explicitly described.

First Embodiment

Hereinafter, a first embodiment of the present disclosure will be described with reference to FIGS. 1 to 3. FIG. 1 is a view of a vehicle 10 when being viewed from above of the vehicle 10. The vehicle 10 includes an antenna device 20. The antenna device 20 is a transceiver for communicating with an external device. The antenna device 20 transmits and receives information necessary for a drive assistance control, for example, by radio waves. The antenna device 20 is arranged at a rear end portion of the roof sheet metal 11 of the vehicle 10. The roof sheet metal 11 is a metal plate constituting a roof plate which is one of upper plates of the vehicle 10.

The portion of the antenna device 20 protruding from the roof sheet metal 11 is an antenna unit 21. The antenna unit 21 has a configuration in which an antenna element or the like is housed in a housing. The outer shape of the antenna unit 21 is formed in a streamlined shape that reduces air resistance due to traveling, and is formed in, for example, a shark fin shape.

On the upper surface of the roof sheet metal 11, a vehicle heat shield sheet (hereinafter, simply heat shield sheet) 100 is provided at the antenna unit 21 and a portion around the antenna unit 21. The shape of the heat shield sheet 100 shown in FIG. 1 is a quadrangle. However, the shape of the heat shield sheet 100 may be a shape other than a quadrangle such as an ellipse.

Figure 2:
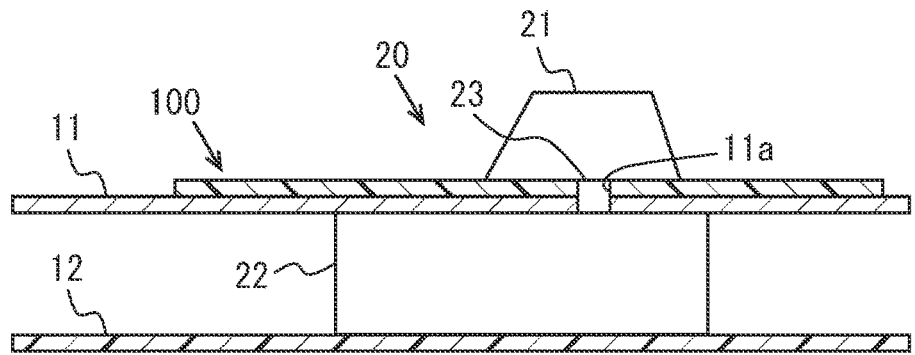
FIG. 2 is a cross-sectional view showing a mounting structure of an antenna device.

FIG. 2 is a cross-sectional view showing a mounting structure of an antenna device 20. The antenna device 20 includes an antenna unit 21 and a wireless circuit 22. The wireless circuit 22 is provided on the lower surface side of the roof sheet metal 11, that is, in the vehicle interior. The antenna unit 21 and the wireless circuit 22 are electrically connected by a connector 23 that passes through a through hole 11a formed in the roof sheet metal 11. Around the through hole 11a, a waterproof structure (not shown) is provided to prohibit rainwater or the like on the upper surface (outer surface) of the roof sheet metal 11 from entering the vehicle interior.

The wireless circuit 22 is an electronic unit, and includes a modulation circuit for wirelessly transmitting a signal, a demodulation circuit for demodulating a signal from a radio wave received by the antenna unit 21, and the like. Since the wireless circuit 22 is provided at a position opposite to the antenna unit 21 with respect to the roof sheet metal 11 interposed therebetween, the antenna unit 21 and the wireless circuit unit 22 are arranged close to each other. As a result, it is possible to prevent the signal from being attenuated between the antenna unit 21 and the wireless circuit 22. The wireless circuit 22 is electrically connected to a vehicle controller mounted on the vehicle 10 by wire or wireless.

The wireless circuit 22 is arranged between the roof sheet metal 11 and a liner 12. The liner 12 is a lining of a passenger compartment of the vehicle. Because the wireless circuit 22 is hidden by the liner 12, the wireless circuit 22 is not visible by occupants in the passenger compartment.

Next, the heat shield sheet 100 will be described. The heat shield sheet 100 is configured to suppress the transfer of solar heat to the wireless circuit 22 which is an electronic device. The heat shield sheet 100 is provided so as to cover an entire projection area of the wireless circuit 22 projected on the roof sheet metal 11. The length of one side of the heat shield sheet 100, which is quadrangular when viewed from above, is 500 mm, for example.

The configuration for suppressing the transfer of solar heat to the wireless circuit 22 is not limited to the heat shield sheet 100. A configuration different from the heat shield sheet 100 may be provided to suppress the transfer of solar heat to the wireless circuit 22. For example, it may be considered to provide a heat insulating material between the roof sheet metal 11 and the liner 12, or to provide an aluminum sheet between the roof sheet metal 11 and the wireless circuit 22. In the present embodiment, a configuration for suppressing the transfer of solar heat to the wireless circuit 22, different from the heat shield sheet 100, may be omitted.

Figure 3:
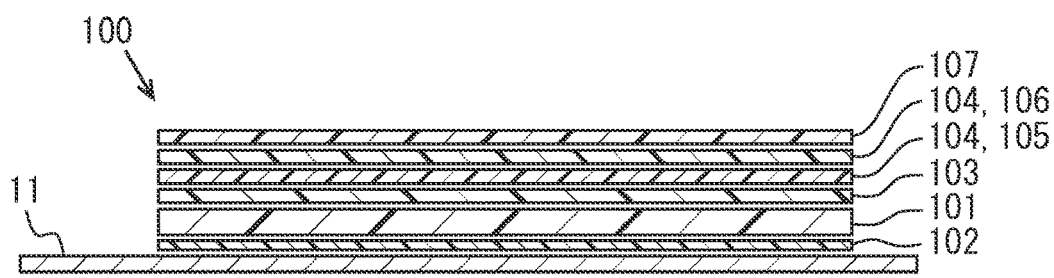
FIG. 3 is a cross-sectional view showing a stacked structure of a heat shield sheet according to a first embodiment.

FIG. 3 is an enlarged cross-sectional view of the heat shield sheet 100. The heat shield sheet 100 includes a base sheet 101, and an adhesive layer 102 is stacked on the lower side of the base sheet 101. A low emissivity coating layer 103, a colored infrared transparent layer 104, and a top coat layer 107 are stacked on the upper side of the base sheet 101 in this order from the side of the base sheet 101. Further, the colored infrared transparent layer 104 includes two layers, a black infrared transparent paint layer 105 and a decorative paint layer 106. Both layers of the black infrared transparent paint layer 105 and the decorative paint layer 106 have a thickness of 50 microns or less. In the present description of the heat shield sheet 100, the vertical direction means a vehicle up and down in a state where the heat shield sheet 100 is disposed in the vehicle 10.

The base sheet 101 is a flexible sheet that can be bent and aligned with the curved roof sheet metal 11. The thickness of the base sheet 101 can be various, and is, for example, about 0.01 mm. The thickness of the base sheet 101 can be set in consideration of workability such as molding work of each layer on the upper and lower surfaces and sticking work of the heat shield sheet 100 to the roof sheet metal 11. The material of the base sheet 101 is vinyl chloride resin, fluororesin, or the like. For the base sheet 101, a material having a higher thermal strength than these, for example, PET can also be used.

The color of the base sheet 101 may be colorless and transparent. In the heat shield sheet 100 of the present embodiment, the appearance color is determined by the color of the decorative paint layer 106, and the low emissivity coating layer 103 is stacked on the base sheet 101. Thus, the color of the base sheet 101 does not have to be colorless and transparent.

As the adhesive layer 102, various materials can be used as long as the roof sheet metal 11 and the layer stacked on the adhesive layer 102 can adhere to each other. Further, a double-sided tape coated with an adhesive can also be used as the adhesive layer 102.

The low emissivity coating layer 103 is a low emissivity paint and may be white in color. Low emissivity has the same meaning as "high reflectance". A paint used as a low emissivity paint or a high reflectance paint can be used as a paint constituting the low emissivity coating layer 103. The paint can also be expressed as ink.

The emissivity described in the present embodiment is the emissivity for infrared rays. In particular, the emissivity of infrared rays may be set to the emissivity of near infrared rays. The infrared rays generally have a wide wavelength range. In a case where the infrared rays are transmitted or reflected, there are many practical restrictions if the entire region of infrared rays is targeted. In the present embodiment, although the infrared rays described below preferably cover the entire region of infrared rays, the near infrared rays can be mainly used.

If the low emissivity coating layer 103 is white, the reflectance of infrared rays is high, and it can be maintained at a low emissivity regardless of the material. Further, even if it is not white, a white type paint other than white may be used as the low emissivity coating layer 103. That is, the white type includes white and a white color similar to the white. If the white is the main component, the low emissivity coating layer 103 is the white type even if it is slightly colored.

If the low emissivity, that is, the high reflectance is expressed numerically, for example, a reflectance of 50% or more can be defined as the high reflectance. Of course, a paint having a reflectance of 60% or more, 70% or more, 80% or more may be used suitably as the high reflectance paint.

As the low emissivity coating layer 103, a high-reflectivity powder having high infrared reflectance dispersed in an infrared transmissive substrate can be used. Since the near infrared rays have a wavelength close to that of visible light, visually transparent materials can be used as an infrared-ray transmitting base material if they are visually transparent. As the infrared rays to be transmitted, for example, when the transmittance is 70% or more, preferably 80% or more, and more preferably 90% or more, infrared rays can be transmitted.

The high reflectance powder is, for example, titanium oxide or silica. In addition, ceramic may be used as the high reflectance powder. The high reflectance powder for the low emissivity coating layer 103 may be configured such that the low emissivity coating layer 103 in which the high reflectance powder is dispersed can achieve the above-mentioned numerical value of reflectance.

The high reflectance powder may have a shape other than the spherical shape, but is preferably spherical. Further, the particle size of the high reflectance powder is preferably about ¼ of the wavelength of the near infrared rays. This is because it is known that the reflectance of the near infrared rays is particularly good when the particle size is about this level.

In a case where a high reflectance powder is dispersed onto a low emissivity paint to form the low emissivity coating layer 103, if the layer thickness is too thin, the amount of sunlight transmitting through the low emissivity coating layer 103 may be increased without hitting the high reflectance powder. For this reason, when the particle size of the high reflectance powder is about ¼ of the wavelength of the near infrared rays, the layer thickness is preferably about 40 microns.

The black infrared transparent paint layer 105, which is a layer of the colored infrared transparent layer 104, is a black layer that transmits infrared rays. Since the black infrared transparent paint layer 105 is black, it hardly transmits visible light. Commercially available infrared transmissive ink can be used for the black infrared transparent paint layer 105. Since the commercially available infrared transmissive ink is generally black, the commercially available infrared transmissive ink can be used as it is as the black infrared transparent paint layer 105. The black infrared transmissive ink can be produced, for example, by mixing a black pigment and a solution that transmits light in the near infrared region.

The decorative paint layer 106 is a layer that is colored and transmits infrared rays. The decorative paint constituting the decorative paint layer 106 can be, for example, a paint in which mica is dispersed in the infrared transmissive paint (hereinafter, infrared transmissive mica paint). The color of the decorative paint layer 106 becomes an appearance color of the heat shield sheet 100. Therefore, the decorative paint layer 106 uses the infrared transmissive mica paint in which mica is dispersed in the infrared transmissive base material when the body color of the vehicle 10 is painted with mica paint. There are various colors of mica. Therefore, the infrared transmissive mica paint, in which mica is dispersed in a transparent infrared transmissive base material, can become a car body color or a color similar to the car body color.

When the body color of the vehicle 10 is not mica, an infrared transmissive paint which exhibits a body color or a color similar to the body color and does not contain mica is used for the decorative paint layer 106. Such a paint for the decorative paint layer 106 can be produced by mixing a body color or a colored paint having a color similar to the body color with a transparent coating material. As the colored paint, it is preferable to use an infrared reflective paint or an infrared transmitting paint. When the black infrared transparent paint layer 105 is black, the decorative paint layer 106 may be omitted if the body color of the vehicle 10 is black without using mica.

The top coat layer 107 is a layer for the purpose of preventing scratches and deterioration, and is colorless and transparent to infrared rays. Similar to the infrared transmissive substrate, a material that is visually transparent can be used as an infrared transmissive material. As a material constituting the top coat layer 107, for example, a fluororesin, a silicon resin, a urethane resin, an acrylic resin, or the like can be used as a base material. The top coat layer 107 has an ultraviolet transmission suppressing function by using a material to which an ultraviolet blocking agent is added to the base material.

In the heat shield sheet 100 configured in this way, the respective layers from the low emissivity coating layer 103 to the top coat layer 107 are sequentially stacked by printing or coating.

(Explanation of Heat Shield Effect by Heat Shield Sheet 100)

The vehicle controller is often arranged in an instrument panel of the vehicle, but the wireless circuit 22 does not use the installation space in the instrument panel. In this case, the installation space in the instrument panel can be used for other devices. In this embodiment, the wireless circuit 22 can be installed by effectively using the ceiling space between the roof sheet metal 11 and the liner 12.

Normally, the vicinity of the roof sheet metal 11 is likely to be in a high temperature environment due to sunlight, but in the present embodiment, the heat shield sheet 100 is arranged at a position opposite to the wireless circuit 22 with respect to the roof sheet metal 11 interposed therebetween. As a result, the temperature rise of the wireless circuit 22 due to sunlight can be suppressed.

The heat shield sheet 100 includes a low emissivity coating layer 103. Since the low emissivity coating layer 103 is the white color, the reflectance of sunlight is higher than when the low emissivity coating layer 103 is a color other than the white color. Therefore, the solar heat can be reflected efficiently by the low emissivity coating layer 103. Further, since the heat shield sheet 100 is thin, it is difficult to interfere with heat dissipation of the wireless circuit 22. Therefore, even under the scorching sun, the heat of the wireless circuit 22 can be efficiently dissipated through the roof sheet metal 11 and the heat shield sheet 100.

In addition, the heat shield sheet 100 includes the colored infrared transparent layer 104 that is stacked on the solar radiation side of the low emissivity coating layer 103 and transmits infrared rays. The decorative paint layer 106, which is the upper layer of the colored infrared transparent layer 104, is layer having a body color of the vehicle 10 or a layer having a color similar to the body color of the vehicle 10. Therefore, even when the heat shield sheet 100 is arranged on the vehicle 10, the heat shield sheet 100 can be made inconspicuous.

Further, the colored infrared transparent layer 104 is the vehicle body color of the vehicle 10 or a layer having a color similar to the vehicle body color, but the low emissivity coating layer 103 does not need to be changed according to the vehicle body color. Therefore, the versatility of the low emissivity coating layer 103 is improved.

Further, since the colored infrared transparent layer 104 transmits infrared rays, it is possible to prevent this layer from absorbing solar heat and from reducing the infrared reflection effect of the low emissivity coating layer 103 positioned under the colored infrared transparent layer 104.

Further, since the low emissivity coating layer 103 has a structure in which the high reflectance powder is dispersed in the infrared transmissive substrate, the radiation of solar heat can be particularly reduced.

Further, since the heat shield sheet 100 includes the top coat layer 107 stacked on the colored infrared transparent layer 104, the colored infrared transparent layer 104 and the layer below the colored infrared transparent layer 104 can be protected from scratches. Further, since the top coat layer 107 is infrared transmissive, the sunlight reflection function of the low emissivity coating layer 103 is not affected by the top coat layer 107. Further, since the top coat layer 107 also has an ultraviolet ray blocking function, it is possible to reduce deterioration such as decolorization of the lower layer than the top coat layer 107.

The heat shield sheet 100 includes the black infrared transparent paint layer 105 that transmits infrared rays. The decorative paint layer 106, which is stacked on the black infrared transparent paint layer 105, has a body color different from black and transmits infrared rays. In this way, the decorative paint layer 106 is stacked on the black infrared transparent paint layer 105 having the black color. Compared with a case where the decorative paint layer 106 is directly stacked on the low emissivity paint layer 103 which is white, it is possible to improve the color development by laminating the decorative paint layer 106 on the black.

Therefore, the decorative paint layer 106 uses the infrared transmissive mica paint in which mica is dispersed in the infrared transmissive base material when the body color of the vehicle 10 is painted with mica paint. At this time, if the lower layer is black, the color development of the decorative paint layer 106 can be particularly improved. Moreover, since the decorative coating layer 106 uses an infrared transmissive base material, heat absorption of the decorative coating layer 106 can also be suppressed.

Since the base sheet 101 is flexible, the heat shield sheet 100 is flexible as a whole. Therefore, the heat shield sheet 100 can be arranged in close contact with the curved roof sheet metal 11.

Second Embodiment

Next, a heat shield sheet 200 of the second embodiment will be described with reference to FIG. 4. In the heat shield sheet 200, the low emissivity paint layer 103 is the lowest layer, which is different from the heat shield sheet 100 of the above-described first embodiment. The stacking order of the other layers 102, 101, 105, 106, 107 in the heat shield sheet 200 is the same as that of the heat shield sheet 100.

Figure 4:
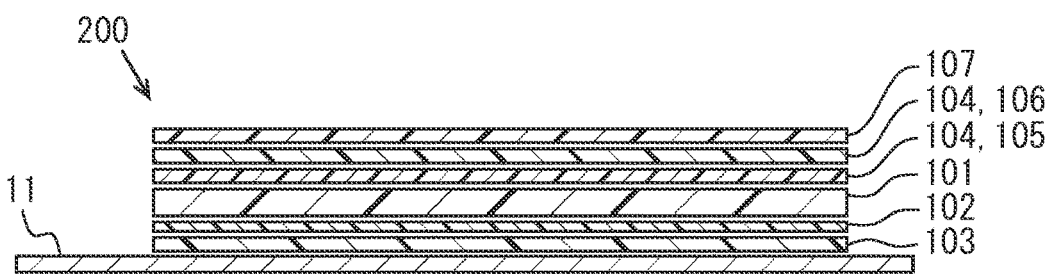
FIG. 4 is a cross-sectional view showing a stacked structure of a heat shield sheet according to a second embodiment.

Since the base sheet 101 is transparent, the low emissivity coating layer 103 may be stacked below the base sheet 101, as shown in FIG. 4. The heat shield sheet 200 is made by laminating the layers from the adhesive layer 102 to the top coat layer 107, before installing the heat shield sheet 200 on the vehicle 10. The low emissivity paint layer 103 is directly coated on the roof sheet metal 11. After that, the layers from the adhesive layer 102 to the top coat layer 107, which are integrally prepared, are attached to the low emissivity coating layer 103 by the adhesive layer 102.

Third Embodiment

Figure 5:
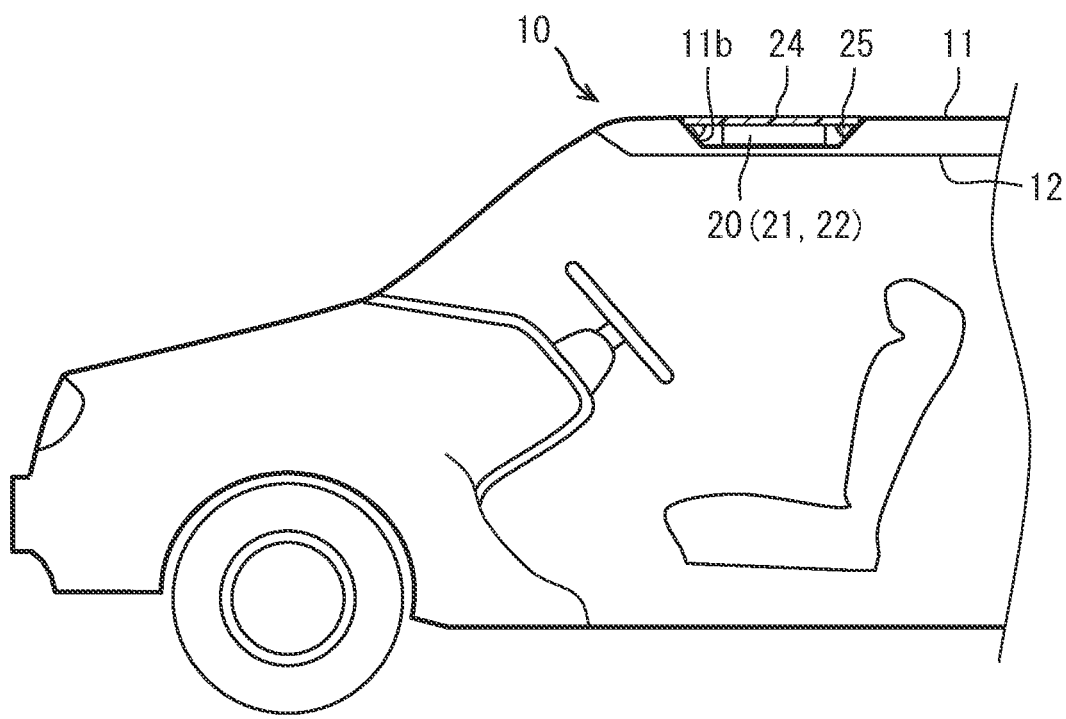
FIG. 5 is a cross-sectional view showing a mounting structure of an antenna device according to a third embodiment.
Figure 6:
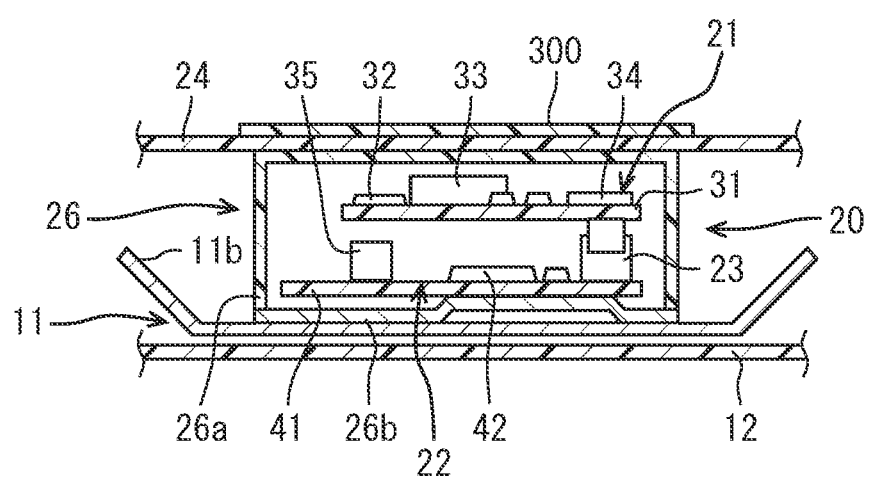
FIG. 6 is a cross-sectional view showing a mounting structure of the antenna device according to the third embodiment.
Figure 7:
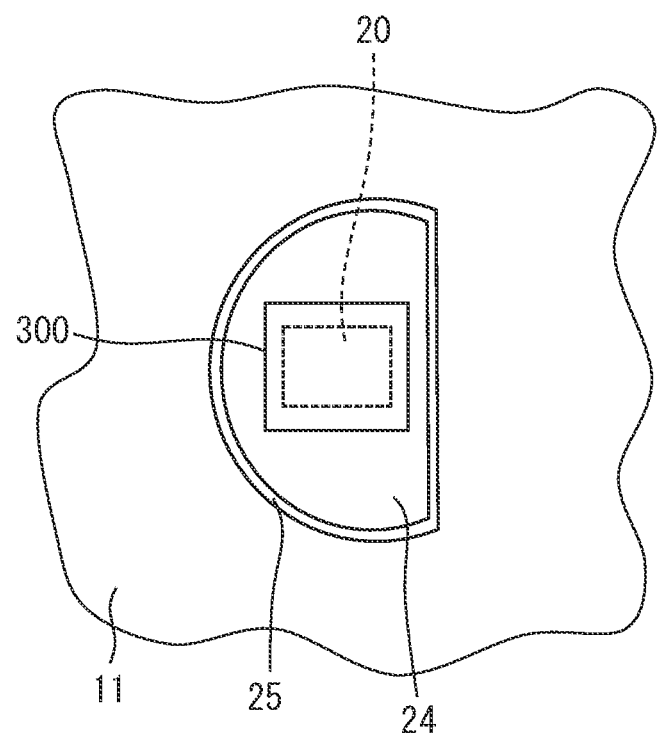
FIG. 7 is an enlarged plan view showing a part of a roof sheet metal of the third embodiment.

Next, a vehicle 10 of the third embodiment will be described with reference to FIGS. 5 to 7. As shown in FIGS. 5 and 6, in an antenna device 20 of the present embodiment, not only the antenna unit 21 but also the wireless circuit 22 are arranged on the upper surface of the roof sheet metal 11. The roof sheet metal 11 is provided with a recess 11b that is recessed from other portion and accommodates the antenna device 20. The side wall of the recess 11b is formed in a tapered shape so that the area of the horizontal cross section with the side wall becomes smaller as toward the lower side. The bottom surface of the recess 11b is located above the liner 12. The recess 11b of the roof sheet material 11 defines an accommodation space for accommodating the antenna device 20.

The upper side of the antenna device 20 is covered with an antenna cover 24. The antenna cover 24 is made of a material that transmits electrical waves (i.e., radio waves), and is made of, for example, resin. The electrical wave transmission of the antenna cover 24 means that it is not necessary to transmit 100% of the electrical waves, and electrical waves may be partially shielded as long as it is generally used as an electrical wave transmitting member. For example, any material that transmits 90% or more of the electrical waves transmitted and received by the antenna device 20 can be used as the antenna cover 24.

The antenna cover 24 extends from an upper surface of the roof sheet metal 11 around the antenna device 20 and covers the upper side of the antenna device 20. The antenna cover 24 is sealed and fixed to the upper surface of the roof sheet metal 11 with a sealing rubber 25 and an adhesive so as to have a dustproof and waterproof effect.

The antenna cover 24 is configured to cover the recess 11$b$ of the roof sheet metal 11 on the same surface of the upper surface of the roof sheet metal 11 without having a convex portion with respect to the upper surface of the roof sheet metal 11, so that the roof sheet metal 11 has a smooth appearance, which is different from that of FIG. 1. Further, the antenna cover 24 may be integrated with the antenna device 20 or may be a separate member separated from the antenna device 20. The antenna cover 24 is painted with the same paint color as the vehicle 10.

Next, the antenna device 20 will be described in more detail with reference to FIG. 6. As shown in FIG. 6, in the antenna device 20, the antenna unit 21 and the wireless circuit 22 are housed in the same housing 26. The antenna unit 21 includes an antenna circuit board 31, an antenna circuit element 32, a global navigation satellite system (GNSS) antenna 33, a pattern antenna 34, and a vertically polarized antenna 35. The wireless circuit 22 includes a communication circuit board 41, a communication IC (Integrated Circuit) 42, and a connector 23.

The housing 26 has a rectangular parallelepiped shape and is configured to house the antenna unit 21 and the wireless circuit 22 therein. The housing 26 is configured by a resin case 26$a$ and an aluminum cover 26$b$. The resin case 26$a$ is made of a resin material and has a hollow rectangular parallelepiped shape, and one of the six surfaces is open. Therefore, the resin case 26$a$ has a so-called bathtub shape.

The aluminum cover 26$b$ is made of aluminum or an aluminum alloy and is provided to cover the open surface of the resin case 26$a$. The aluminum cover 26$b$ is made of a metal plate and is configured to form a part of the housing 26. The aluminum cover 26$b$ has excellent heat transfer properties and is a main part that dissipates heat inside the housing 26 to the outside. The aluminum cover 26$b$ is molded by drawing, and is fixed to the resin case 26$a$ by fitting with screws, hooks, or the like. The housing 26 is arranged so that the aluminum cover 26$b$ is located on the lower side, that is, on the vehicle interior side. The housing 26 is fixed to, for example, the roof sheet metal 11.

The antenna circuit board 31 and the communication circuit board 41 are arranged in parallel at intervals in the vertical direction, and the antenna circuit board 31 and the communication circuit board 41 are electrically connected by a connector 23. The antenna circuit board 31 is located above the communication circuit board 41, and the solid type GNSS antenna 33 is provided on the upper surface of the antenna circuit board 31. Further, the pattern antenna 34 for receiving horizontally polarized waves is provided on the upper surface of the antenna circuit board 31. Further, the vertically polarized wave antenna 35 for receiving vertically polarized waves is provided on the upper surface of the communication circuit board 41. The vertically polarized wave antenna 35 is provided so as to project upward from the upper surface of the communication circuit board 41.

The antenna circuit element 32 is mounted on the upper surface of the antenna circuit board 31. The antenna circuit element 32 is connected to the GNSS antenna 33, the pattern antenna 34, and the vertically polarized antenna 35, and includes a demodulation circuit that demodulates a signal from the electrical waves received by each antenna.

The communication IC 42 and the connector 23 are mounted on the communication circuit board 41. The communication IC 42 is electrically connected to a vehicle controller mounted on the vehicle 10 by wire or wireless. The communication IC 42 includes a modulation circuit for wirelessly transmitting a signal and the like.

Each antenna transmits and receives electrical waves such as radio wavers. In particular, because the pattern antenna 34 is covered with the antenna cover 24 which is made of resin and can transmit electrical waves, it does not interfere with transmission and reception of the electrical waves. Further, since the recess 11$b$ of the roof sheet metal 11 is formed in a tapered shape, the vertically polarized wave antenna 35 is formed so as not to interfere with electrical waves in the horizontal direction at that angle.

Next, a heat shield sheet 300 of the present embodiment will be described. The heat shield sheet 300 is provided on the upper surface of the antenna cover 24. The heat shield sheet 300 is configured to suppress the transfer of solar heat to the antenna device 20. The heat shield sheet 300 is provided to cover the entire projection area of the antenna device 20 projected on the antenna cover 24. Further, preferably, as shown in FIG. 7, the heat shield sheet 300 is provided in a range larger than the projection area of the antenna device 20 projected on the antenna cover 24. The heat shield sheet 300 may be provided on the entire antenna cover 24.

Similar to the first embodiment, the heat shield sheet 300 includes a base sheet 101, an adhesive layer 102, a low emissivity coating layer 103, a colored infrared transparent layer 104, and a top coat layer 107, in the present embodiment. The heat shield sheet 300 transmits electrical waves in the same manner as the antenna cover 24. Therefore, each of the base sheet 101, the adhesive layer 102, the low emissivity coating layer 103, the colored infrared transparent layer 104, and the top coat layer 107 constituting the heat shield sheet 300 is made of a material that transmits electrical wavers (i.e., radio waves).

The base sheet 101, the adhesive layer 102, the colored infrared transparent layer 104, and the top coat layer 107 are made of, for example, resin. When the high reflectance powder used in the low emissivity coating layer 103 is titanium oxide, the content of the high reflectance powder used in the low emissivity coating layer 103 is adjusted so that electrical waves can be transmitted. This is because titanium oxide interferes with the transmission of electrical waves in accordance with the content. Alternatively, for the high reflectance powder, it is preferable to apply a heat-shielding paint of a non-metal additive containing silicon oxide which is silica. Further, the high reflectance powder may be a combination of titanium oxide and silicon oxide.

As described above, in the present embodiment, the antenna device 20 is provided on the upper surface of the roof sheet metal 11. The upper surface of the antenna device 20 is covered with an antenna cover 24. The antenna cover 24 is made of resin because it needs to transmit electrical waves, but infrared rays from the sun are easily received similarly to the roof sheet metal 11 in this case. The temperature of the storage space of the antenna device 20 made of the sealing rubber 25, the antenna cover 24, and the roof sheet metal 11 may reach 100° C. or higher in the hot summer, and may exceed the heat resistance temperature of the electronic elements such as the communication IC 42 disposed inside the storage space.

The heat shield sheet 300 is provided on the upper surface of the antenna cover 24, in the present embodiment. As a result, the temperature rise of the antenna device 20 due to sunlight is suppressed. Further, since the heat shield sheet 300 transmits electrical waves, the temperature rise can be suppressed without interfering with the transmission and reception of electrical waves of the antenna device 20.

In the present embodiment, the radio wave transmittance of the heat shield sheet 300 is made uniform, but the radio wave transmittance is not limited to uniform, and the radio wave transmittance may be partially changed. For example, the heat shield sheet 300 may be provided such that a part of the heat shield sheet 300 corresponding to the projection area has a higher radio wave transmittance, and the other part of the heat shield sheet 300 has a lower radio wave transmittance. The radio wave transmittance of the heat shield sheet 300 can be adjusted by adjusting the content of titanium oxide or the like, or by combining a plurality of heat shield sheet parts having different radio wave transmittances.

Further, in the present embodiment, only the antenna device 20 is installed on the upper surface of the roof sheet metal 11, but the present disclosure is not limited to such a configuration, and the other electronic devices may be installed on the lower side of the roof sheet metal 11. When the electronic device does not transmit and receive electrical waves, the heat shield sheet 100 of the first embodiment described above may be used to improve the heat shield property.

The present disclosure is not limited to the preferred embodiments of the present disclosure described above. Various modifications may be made without departing from the subject matters of the present disclosure.

It should be understood that the configurations described in the above-described embodiments are example configurations, and the present disclosure is not limited to the foregoing descriptions. The scope of the present disclosure encompasses claims and various modifications of claims within equivalents thereof.

(First Modification)

In the above embodiment, the top coat layer 107, which is the uppermost layer, is colorless and transparent, and is infrared-transparent. Further, the top coat layer 107 is made to have an ultraviolet transmission suppressing function. However, the top coat layer 107 may be colored. When the top coat layer 107 is colored, the top coat layer 107, which is the uppermost layer, becomes a colored infrared transparent layer having an ultraviolet transmission suppressing function.

(Second Modification)

In the above-described embodiments, the low emissivity coating layer 103 may be stacked between the base sheet 101 and the adhesive layer 102.

(Third Modification)

Further, in the above embodiment, the heat shield sheet 100, 200 is arranged at a rear end portion of the roof sheet metal 11 which is the upper plate. However, the position of the heat shield sheet 100, 200 may be set at other position other than that disclosed in the above embodiment, as long as the heat shield sheet 100, 200 is positioned on the upper surface of the upper plate and faces the electronic device.

What is claimed is:

1. A heat shield sheet for a vehicle, stacked on an upper surface of an upper plate of the vehicle, the heat shield sheet comprising:
    a low emissivity coating layer having a white color;
    a base sheet on which the low emissivity coating layer is stacked; and
    a colored infrared transparent layer stacked on a solar radiation side of the low emissivity coating layer and configured to transmit infrared rays.

2. The heat shield sheet for a vehicle according to claim 1, wherein
    the low emissivity coating layer is made of an infrared transmissive base material, and a high reflectance powder having an infrared reflectance, which is dispersed in the infrared transmissive base material.

3. The heat shield sheet for a vehicle according to claim 1, further comprising
    a colorless and infrared transparent top coat layer stacked on the colored infrared transparent layer.

4. The heat shield sheet for a vehicle according to claim 3, wherein
    the colored infrared transparent layer is a single layer.

5. The heat shield sheet for a vehicle according to claim 3, wherein
    the colored infrared transparent layer includes a black paint layer which transmits infrared ray and stacked at the upper side of the base material sheet, and a decorative paint layer that is stacked on the black paint layer, is colored to be different from black and transmits infrared rays.

6. The heat shield sheet for a vehicle according to claim 5, wherein
    the decorative paint layer is made of a layer in which mica is dispersed in an infrared transparent paint.

7. The heat shield sheet for a vehicle according to claim 1, wherein
    the colored infrared transparent layer is a top layer and is configured to have an ultraviolet-transmission suppressing function.

8. The heat shield sheet for a vehicle according to claim 1, wherein the base sheet is flexible.

9. The heat shield sheet for a vehicle according to claim 1, wherein the base sheet is arranged at the upper surface of the upper plate of the vehicle to be opposite to an electronic device of the vehicle with respect to the upper plate.

10. The heat shield sheet for a vehicle according to claim 1, wherein the base sheet is arranged to cover an upper surface of an antenna device of the vehicle.

11. A vehicle comprising:
    the heat shield sheet according to claim 1, installed at the upper surface of the upper plate of the vehicle; and
    an electronic device installed at a position opposite to the heat shield sheet with respect to the upper plate.

12. A vehicle configured to transmit electrical wave, the vehicle comprising:
    an antenna device installed at the upper surface of the upper plate to transmit or receive electrical waves;
    an antenna cover extending from the upper surface of the upper plate around the antenna device to cover an upper side of the antenna device and to transmit the electrical waves; and
    the heat shield sheet according to claim 1, installed at an upper surface of the antenna cover.

* * * * *